(12) United States Patent
Dumur et al.

(10) Patent No.: US 10,470,603 B2
(45) Date of Patent: Nov. 12, 2019

(54) BREWING UNIT FOR A FOOD PREPARATION MACHINE

(71) Applicant: NESTEC S.A., Vevey (CH)

(72) Inventors: Philippe Dumur, Serraval (FR); Fabien Ludovic Agon, Blonay (CH); Youcef Ait Bouziad, Echandens (CH)

(73) Assignee: Societe des Produits Nestle S.A., Vevey (CH)

( * ) Notice: Subject to any disclaimer, the term of this patent is extended or adjusted under 35 U.S.C. 154(b) by 575 days.

(21) Appl. No.: 15/116,943

(22) PCT Filed: Mar. 2, 2015

(86) PCT No.: PCT/EP2015/054306
§ 371 (c)(1),
(2) Date: Aug. 5, 2016

(87) PCT Pub. No.: WO2015/132203
PCT Pub. Date: Sep. 11, 2015

(65) Prior Publication Data
US 2017/0127872 A1    May 11, 2017

(30) Foreign Application Priority Data
Mar. 6, 2014  (EP) .................................... 14158146

(51) Int. Cl.
*A47J 31/24*       (2006.01)
*A47J 31/36*       (2006.01)
*A47J 31/06*       (2006.01)

(52) U.S. Cl.
CPC ....... *A47J 31/3695* (2013.01); *A47J 31/0668* (2013.01); *A47J 31/369* (2013.01);
(Continued)

(58) Field of Classification Search
CPC ................ A47J 31/3695; A47J 31/3628; A47J 31/3623; A47J 31/3676
(Continued)

(56) References Cited

U.S. PATENT DOCUMENTS

| 2013/0263423 A1* | 10/2013 | Clark | A47J 31/407 |
| | | | 29/428 |
| 2015/0059587 A1* | 3/2015 | Colleoni | A47J 31/3628 |
| | | | 99/295 |

(Continued)

FOREIGN PATENT DOCUMENTS

| CN | 102008248 A | 4/2011 |
| CN | 102753063 A | 10/2012 |

(Continued)

*Primary Examiner* — Reginald Alexander
(74) *Attorney, Agent, or Firm* — K&L Gates LLP

(57) ABSTRACT

The invention concerns a brewing unit (3) having a cavity for enclosing a food ingredient contained in a package (C), comprising first (14) and second (15) cavity parts, and fluid injection means (13), characterized in that said first and second cavity parts (14, 15) are hinged in a pivotal arrangement between open and closed positions and in that, when said cavity parts are pivoted in a closed position, the fluid injection means (13) and/or the first cavity part (14) are movable in translation relative to the second cavity part (15), between:—a closed unlocked position that allows relative pivotal movement between cavity parts, and—a closed locked position wherein said cavity parts are translated in contact with each other to close said brewing cavity, and wherein said injection means (13) protrude inside the brewing cavity to pierce a wall of the portion package.

13 Claims, 14 Drawing Sheets

(52) U.S. Cl.
CPC ........ *A47J 31/3628* (2013.01); *A47J 31/3623* (2013.01); *A47J 31/3676* (2013.01)

(58) Field of Classification Search
USPC .................................................. 99/295, 323
See application file for complete search history.

(56) References Cited

U.S. PATENT DOCUMENTS

| | | | | |
|---|---|---|---|---|
| 2015/0059589 A1* | 3/2015 | Xue | ...................... | A47J 31/407 |
| | | | | 99/295 |
| 2015/0250351 A1* | 9/2015 | Yoakim | ............... | A47J 31/4403 |
| | | | | 99/295 |
| 2015/0257579 A1* | 9/2015 | Dammermann | ...... | A47J 31/407 |
| | | | | 426/454 |
| 2015/0289707 A1* | 10/2015 | Kaeser | .................... | A47J 31/22 |
| | | | | 99/295 |

FOREIGN PATENT DOCUMENTS

| | | |
|---|---|---|
| CN | 202801256 U | 3/2013 |
| CN | 103124509 A | 5/2013 |
| KR | 20120000145 U | 1/2012 |
| WO | 9743937 | 11/1997 |
| WO | 2010026529 | 3/2010 |
| WO | 2012049052 | 4/2012 |

* cited by examiner

BREWING UNIT FOR A FOOD PREPARATION MACHINE

CROSS REFERENCE TO RELATED APPLICATIONS

The present application is a National Stage of International Application No. PCT/EP2015/054306, filed on Mar. 2, 2015, which claims priority to European Patent Application No. 14158146.2, filed Mar. 6, 2014, the entire contents of which are being incorporated herein by reference.

FIELD OF THE INVENTION

The present invention concerns a food preparation machine, more precisely a beverage preparation machine comprising a brewing unit that is detachable from the main machine base.

BACKGROUND OF THE INVENTION

Food preparation systems are well known in the food science and consumer goods area. Such systems allow a consumer to prepare at home a given type of food, for instance a beverage such as a coffee-based beverage, e.g. an espresso or a filter-like coffee cup.

In the following description, the invention will described in relation to a specific application to beverage preparation systems. However, the invention globally encompasses systems for non-beverage items preparation, such as for instance ice cream, soups comprising particles (herbs, croutons, etc.), jellies, dairy items (e.g. yogurts, cream desserts, etc.), or any kind of similar non liquid flowable edible products.

Today, most preparation systems for in-home food and beverage preparation comprise a machine having a so-called "brewing chamber" or "brewing unit" or "extraction chamber" which can accommodate portioned ingredient for the preparation of the food or beverage. A brewing unit comprises several parts which are designed to be assembled so as to create a closed cavity wherein the food or beverage ingredient can be placed. The brewing unit comprises means for injecting a preparation medium under pressure such as a fluid which is typically water through the ingredient, so as to prepare a corresponding food or beverage, which is then dispensed out of the brewing unit to the consumer. The preparation fluid is sourced from a fluid conducting system of the machine to which the brewing unit is connected. The preparation is performed within the brewing unit at a pressure above the atmospheric pressure, which is typically comprised between 1 and 20 bar, preferably between 2 and 15 bar (relative pressure).

The preparation is performed by passing preparation fluid through the ingredient contained in a capsule or pod. For this reason, it is an essential characteristic of a brewing unit to be able to withstand a pressure difference between inside the cavity, and the ambient pressure (which is generally equal or substantially equivalent to atmospheric pressure) without opening itself when pressure inside the cavity increases (typically fluid pressure, e.g. water pressure).

Ingredient portions are pre-dosed before they are placed into the cavity of the brewing unit, and can take the form of soft pods or pads, or sachets. More and more systems utilize semi-rigid or rigid portions such as rigid pods or capsules. In the following, it will be considered that the beverage machine of the invention is a beverage preparation machine working with a rigid or semi-rigid capsule, to be placed directly into the brewing unit of the machine.

As said above, the so-called "brewing unit" of a machine comprises a receptacle or cavity for accommodating the ingredient capsule, and a fluid injection system for injecting a fluid, preferably water, under pressure through said ingredient, preferably by piercing through a wall of the capsule that contains the ingredient (in some instances though, if the ingredient capsule is open along at least one its sides, it is not necessarily mandatory to pierce the capsule walls to inject an extraction fluid therein. Fluid injection means can typically comprise at least one needle, able to pierce the capsule walls if needed. Water injected under pressure through the ingredient, for the preparation of a coffee beverage according to the present invention, is preferably hot, that is to say at a temperature above 70° C. However, in some particular instances, it might also be at ambient temperature, or even chilled. The pressure inside the brewing unit during extraction and/or dissolution of the ingredient is typically about 1 to about 8 bar for dissolution products and about 2 to about 12 bar for extraction of roast and ground coffee.

Some food and beverage preparation systems have been developed, wherein the brewing unit can be detached from the main machine body so that the machine is modular: it gives the possibility to the consumer to adapt one or another brewing unit corresponding to a particular type of ingredient capsule, according to its needs. Some capsule types can be larger or taller, or have different shapes depending on the type of beverage ingredient contained therein. In this case, it is possible to detach the brewing unit from the beverage machine base, so that said brewing unit is easier to clean (the brewing unit is usually the functional part of the machine which is in contact with the ingredient or the beverage, and therefore it more likely to need regular maintenance and cleaning). The main machine base contains all functional elements necessary for circulating and preparing the brewing fluid for injection into the capsule or pod ingredient contained in the brewing unit. Such functional elements are selected within the list of, but are not limited to: a fluid source (reservoir or connection to an external fluid source such as tap water for instance), a fluid pump, a fluid heating and/or chilling element, a fluid pipe system to link other functional elements of the beverage machine, a valve system to circulate the fluid from the functional elements of the machine and towards the brewing unit, and a control panel linked to an electronic board for managing the beverage preparation parameters and proper actuation of the functional elements.

Most preferably, such detachable brewing unit must be able to withstand a pressure inside the brewing unit cavity that is above ambient pressure, and can be up to 20 bar, when said brewing unit is functionally attached to the beverage machine base, but also when said brewing unit is detached from the machine base. In other words, opening of the brewing unit must be performed only by the user. Unexpected opening of the brewing unit which is detached from the main machine base must be avoided for safety and cleanliness reasons: such unexpected opening of the brewing unit when internal pressure builds-up could cause splashes of hot food product contained therein, which could cause injuries to the consumer, or at least be messy and therefore undesirable.

In order to facilitate handling of the brewing unit, the cavity is typically made of two parts—a capsule or pod receiving cavity and a closing lid—. Furthermore, in order to ensure that the functional adaptation of both parts is optimal when said brewing unit is closed and ready for use, and to prevent leakage risks, both parts are mechanically mounted one to the other around a pivoting hinge. This guarantees that the brewing unit parts are able to open or close for insertion of an ingredient capsule and withdrawal of the used capsule for disposal, while keeping the attachment between the two as solid as possible when the brewing unit is closed. The two parts of the brewing unit can be locked in a closed position by actuating manually a locking mechanism, for instance a bayonet system. Such a detachable brewing unit with locking means is described for instance in Applicant's European applications EP AN 12189878 and EP AN 12189875.

It was surprisingly found though, that in some cases, it is very difficult to close the brewing unit when the ingredient capsule or pod inserted therein is too bulky: once inserted in the capsule or pod-receiving part of the brewing unit, said ingredient capsule or pod protrudes therefrom, such that the closing lid part cannot be pivoted properly to close the brewing unit in a functional configuration. This is more particularly problematic because the injection needle is usually attached to the inside of the closing lid and protrudes from the internal surface of said lid in order to pierce the capsule wall at the time the brewing unit is closed. In that case, due to the pivoting movement of the lid part around the hinge, the applicant has found that the needle tears the capsule or pod wall due to the circular movement of the lid part relative to the cavity part, instead of piercing the capsule wall neatly. Tearing of the capsule wall instead of a neat piercing is highly undesirable, as it causes leaks when liquid (usually water) is injected through the needle under pressure. Such leaks can then spill out of the brewing unit which is a concern from safety and cleanliness perspectives.

There is therefore a need for a flowable food, or beverage preparation machine that comprises at least one detachable brewing unit, that obviates the disadvantages of the known systems.

SUMMARY OF THE INVENTION

The objectives set out above are met with a brewing unit having a brewing cavity for enclosing a food preparation ingredient contained in a portion package, comprising:
(i) first and second cavity parts forming a brewing cavity suitable for enclosing said portion package, and
(ii) fluid injection means embedded into said first cavity part, for injecting fluid under pressure into said package for mixing with said ingredient to form a food product,
characterized in that said first and second cavity parts are hinged one to the other in a pivotal arrangement between open and closed positions around a pivot hinge and in that, when said first and second cavity parts are pivoted in a closed position, said fluid injection means and/or said first cavity part are further movable in translation relative to the second cavity part, along an axis that is perpendicular to the hinge longitudinal axis, between:
  a closed and unlocked position wherein said injection means and/or said first cavity part is/are arranged at a distance from the second cavity part sufficient to allow relative pivotal movement between said cavity parts, and
  a closed and locked position wherein said first and second cavity parts are translated in contact with each other to close said brewing cavity, preferably in a leak-tight manner, and wherein said injection means protrude inside the brewing cavity so as to pierce through a wall of a portion package contained therein.

More precisely, the two cavity parts are pivotally hinged to one another such as to be either pivotally spaced apart around said hinge in an open configuration, or pivotally aligned and closed up to one another. By "aligned", it is meant that the two cavity parts each comprise an opening, and the boundaries of the two openings are substantially in co-axial alignment, in such a way that the two cavities can then be moved relatively one to the other in translation, such that the boundaries of the cavities openings are brought in contact to finally close the cavity.

The first cavity part is preferably the upper cavity part and the second cavity part is preferably the lower cavity part of said brewing unit.

In a preferred embodiment of the invention, the brewing unit is at least partially detachably connectable to the pressurized fluid source of a beverage preparation machine through leak-tight connecting means.

In the latter case, the connecting means are more preferably part of only one cavity part, such that the other cavity part is movable independently and detachable from the fluid source, when the other cavity part of the brewing unit is functionally connected to said source.

Furthermore, said connecting means advantageously comprise a cone-shaped bore adapted to receive a flexible hosepipe of the pressurized fluid source. Alternatively, the connection between the brewing unit and the machine base is performed by a cylindrical protruding channel that fits into a corresponding cylindrical hollow channel.

If data connection is also present, such connection comprises preferably a contactless connection such as Wi-Fi, Bluetooth, radio, or any suitable contactless data transmission protocol. Such data connection can also comprise more traditional direct contact means like electrical plug and socket means. However, those are not preferred as the quality of the transmission in this case, depends on the cleanliness of the beverage system.

In a highly preferred embodiment of the invention, the translation movement of the fluid injection means and/or first cavity part between the closed locked and unlocked positions is actuated by rotating an actuating ring connected to said first cavity part via cam pins and cam grooves that form a cylindrical cam engagement, the first cavity part being further engaged in translation with a non-rotating ring that is pivotally hinged to the second cavity part, so as to transform the rotary movement of the actuating ring into a translation movement of the injection means and/or first cavity part relatively to the second cavity part.

Furthermore, the brewing unit according to the invention preferably comprises locking means for preventing disassembly of the cavity parts, said means able to withstand an internal pressure within the cavity above ambient pressure, so as to keep said cavity closed against said internal pressure when said brewing unit is detached from the pressurized fluid source.

Advantageously, said locking means can comprise a bayonet mechanism actuated by rotating the actuating ring.

In a preferred embodiment, the portion package to be used in the brewing unit according to the invention is a rigid or semi rigid capsule, more preferably a single-dose capsule for preparation of beverages.

More preferably, the brewing unit further comprises a blocking mechanism attached to the non-rotating ring that prevents rotation of the actuating ring and subsequent translation movement of the upper cavity part and water injection means downwards, when the brewing unit is not fully pivoted in the closed position. One preferred embodiment of said blocking mechanism is described in detail in the following description, i.e. a blocking lever pivotally attached to the non-rotating ring attached to the first cavity part, and having a first end that is inserted in a corresponding blocking notch of the actuating ring when the brewing unit is in the open position so as to block the actuating ring from rotation, the second end of said lever protruding out of the non-rotating ring vicinity such that when the brewing unit is pivoted in its closed position, the second end of said lever presses onto the second cavity part to move the first end of the lever out of the blocking notch, to permit rotation of the actuating ring.

Advantageously, the brewing unit comprises sealing means for preventing fluid leakage outside of said unit when the cavity parts are assembled and locked together. More preferably, said sealing means comprise an O-ring located at the interface between cavity parts of the brewing unit.

In any case, the injection means preferably comprise a hollow needle, which is able to pierce through the capsule wall, preferably as long as the wall thickness does not exceed 1 mm, more preferably if said pierceable capsule wall is less than 0.5 mm.

In order to provide a user-friendly experience, the brewing unit according to the invention is preferably water and detergent resistant, and washable in a dishwasher at a temperature comprised between 15° C. and 85° C., preferably between 18° C. and 70° C., and is made of: polyethylene (PE), polypropylene (PP), polystyrene (PS), polycarbonate (PC), metal, alloy, natural or synthetic rubber, or a combination thereof. This allows the consumer to safely and reliably wash and clean the brewing unit and easily remove traces of dirt and splashes that may otherwise impact on the organoleptic and hygienic properties of the beverage system.

In a possible advantageous embodiment of the invention, said brewing cavity has a vertical symmetry axis for accommodating an ingredient package having a symmetrical shape, and wherein the upper cavity part comprises an extraction plate mounted in a rotary arrangement within said upper cavity part, said extraction plate comprising:

(i) at least one injection needle for piercing the ingredient package that is aligned with the central axis of said package, for injecting an ingredient-extracting fluid therein, and (ii) at least one, preferably a plurality of, hollow extracting blades or needles having sharp ends for piercing said package at a distance from the central axis of said package, and conducting the food produced therein from within said package towards the outside of said brewing unit.

The present invention is also directed to a food-, preferably a beverage-, preparation machine comprising a machine base with a fluid source, a fluid heating and/or chilling element, a fluid pump and a fluid connection adapted to leaktightly and releasably connect a detachable brewing unit as described and claimed in the present specification.

The term ingredient "capsule" shall encompass also other types of packages suitable for enclosing a portioned dose of beverage or food ingredient, such as pods, sachets, pouches, and the like.

BRIEF DESCRIPTION OF THE DRAWINGS

Additional features and advantages of the present invention are described in, and will be apparent from, the description of the presently preferred embodiments which are set out below with reference to the drawings in which.

DETAILED DESCRIPTION OF THE INVENTION

Figure 1:
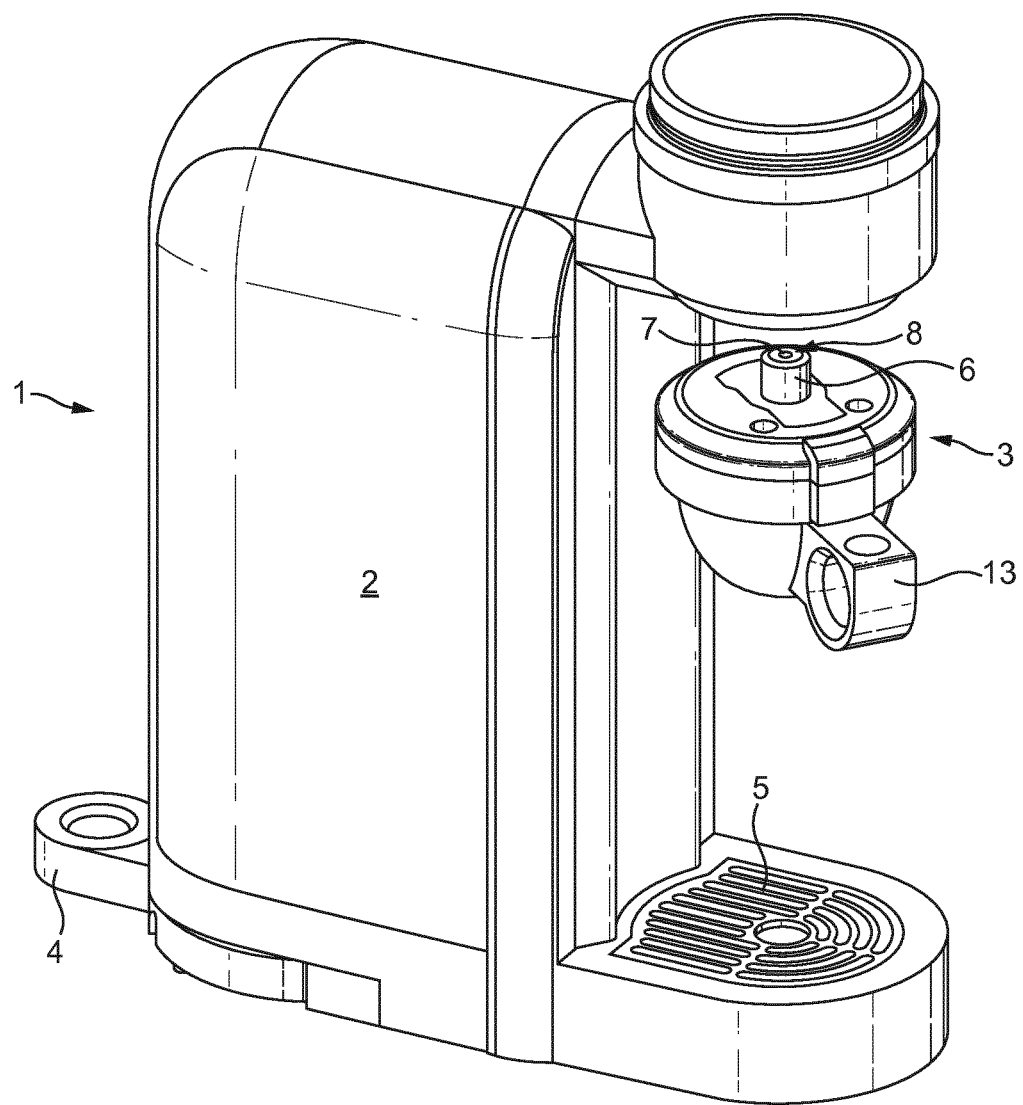
FIG. 1 is a perspective top view of a machine according to the invention with the detachable brewing unit detached from the main machine base.

The detachable brewing unit according to the invention is suitable for use with any kind of ingredient package, but in the following description, it is considered that the ingredient package is an ingredient capsule, made of a semi-rigid or rigid material, which is closed during storage but pierceable to inject an ingredient extracting fluid (e.g. water) therein, and openable to dispense the beverage product prepared by mixing said ingredient and said fluid.

The general principle of extracting and/or dissolving the contents of a closed capsule under pressure is known, and consists typically of inserting the capsule in the brewing cavity of a beverage preparation machine, injecting a quantity of pressurized water into the capsule, generally after piercing a face of the capsule with a piercing injection element such as a fluid injection needle which is associated to the brewing unit of the machine, so as to create a pressurized environment inside the capsule either to extract the substance or to dissolve it.

More precisely, as fluid, preferably water, is injected within the capsule internal compartment, it passes through the ingredient with which it is closely mixed, either to dissolve said ingredient in case the latter is a soluble ingredient, or to extract some compounds of said ingredient. The extracted or dissolved substance is then released through a delivery opening of the capsule. In other words, when fluid—e.g. water—is injected in the capsule compartment, a pressure is built up, which serves as an extraction means for extracting and/or dissolving ingredients contained inside the capsule.

Such ingredients can be for instance a bed of roast and ground coffee. Alternatively or in combination with roast and ground coffee, the ingredients can comprise soluble ingredients, such as for instance beverage premixes such as a milk, coffee, or chocolate soluble powder.

Capsules allowing the application of this principle are described for example in European patents n° EP 1472156 B1, and EP 1784344 B1.

By "pressurized" water, it is meant water (or an equivalent extraction fluid) which is pumped from a reservoir of the machine. For beverage preparation, such as extraction of roast and ground coffee, dissolution of soluble ingredients (coffee, tea, chocolate, etc.), or infusion of infusible material such as tea leaves, the functional pressure is generally comprised between 1 and 20 bar (relative pressure to atmospheric pressure), preferably between 2 and 15 bar.

Embodiments of the invention will now be described, wherein a detachable brewing unit is meant for connecting to a beverage preparation machine base that provides a pressurized fluid source. In the following, it is considered that the pressurized fluid is water, which is provided by the beverage machine base to the brewing unit at a pressure comprised between 2 and 15 bar. The connection of the brewing unit to said base, according to the invention, makes a whole functional beverage preparation machine.

Figure 2:
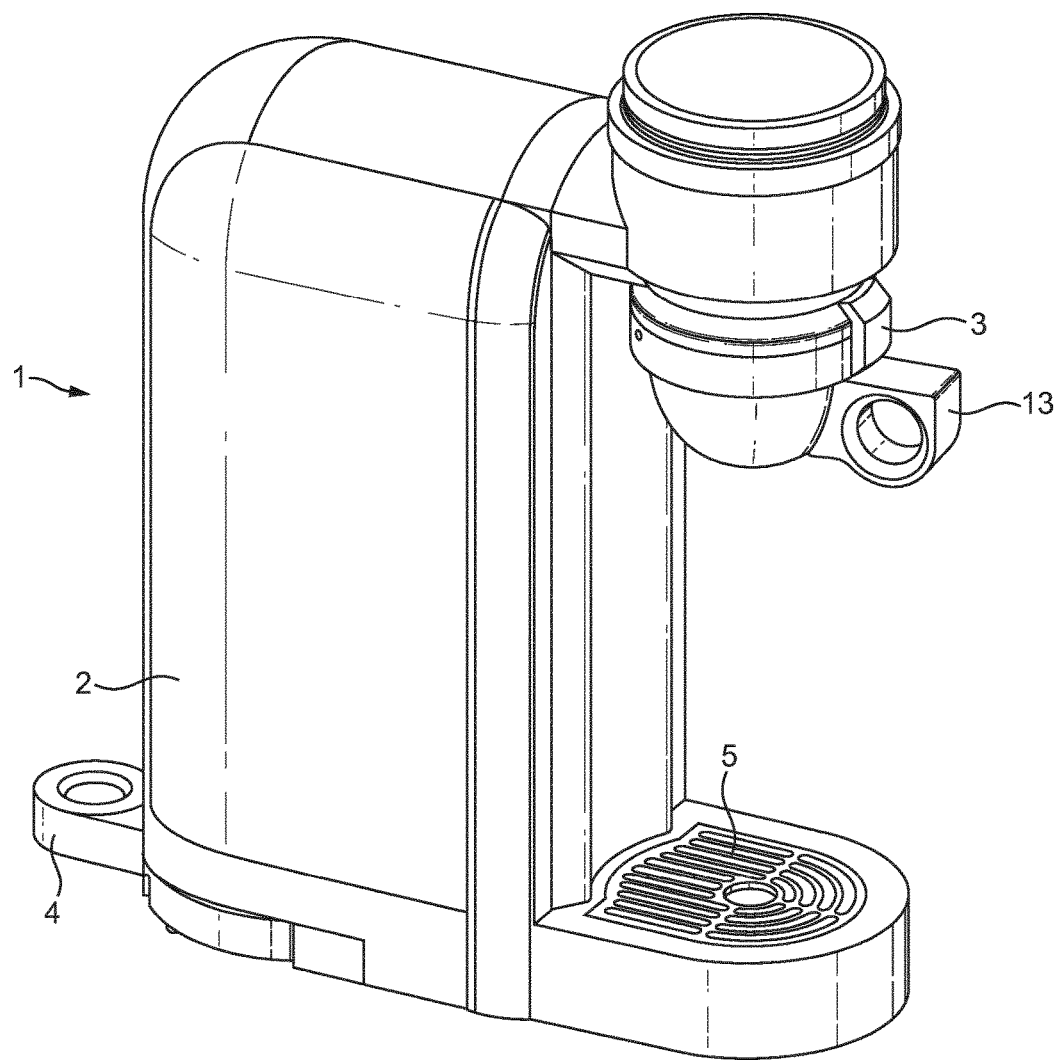
FIG. 2 is a view similar to FIG. 1, wherein the detachable brewing unit is attached to the main machine base.

As illustrated in FIGS. 1 and 2, the beverage preparation machine 1 comprises a main machine base 2, a detachable brewing unit 3, and an ingredient capsule C (not shown in FIG. 1). The capsule is a closed capsule, made for instance of a thermoplastic, a metal, paper, or a combination thereof.

In the embodiments described herein, the capsule C has preferably a frustoconical shape, with a revolution symmetry longitudinal axis which passes through the centre of the top and bottom capsule walls, however, other capsules types can be used with a brewing unit according to the invention, in particular, capsules having a non-symmetrical shape. In use, the capsule C is preferably vertical, however it could also be used in an inclined or horizontal direction, depending on the configuration of the beverage machine brewing chamber.

In the first embodiment of the invention described in greater details hereafter, when it is functionally inserted within the brewing cavity of the beverage machine, the capsule has a top wall which is wider (i.e. larger in diameter) than the bottom wall, as illustrated in FIGS. 3A to 3C, 5B and 5C. On the contrary, in the second embodiment of the invention described in detail in the following, the capsule in its functional configuration has a top wall which is smaller in diameter than the bottom wall, as shown in FIGS. 11B and 11C.

The machine base 2 comprises a fluid reservoir (not shown in the drawing)—in most cases this fluid is water—for storing the fluid that is used to dissolve and/or infuse and/or extract under pressure the ingredient(s) contained in the capsule. The reservoir is detachable and can be plugged in a reservoir port 4 that is built-in with the machine main base, as shown in FIG. 1.

The machine base 2 further comprises a heating element such as a boiler or a heat exchanger (not shown in FIG. 1), which is able to warm up the water used therein to working temperatures (classically temperatures up to 80-90° C.). Finally, the machine comprises a pump element for circulating the water from the tank to the capsule, optionally though the heating element. The way the water circulates within the machine is e.g. selected via a selecting valve means, such as for instance a peristaltic valve of the type described in European patent EP 2162653 B1.

The machine base 2 comprises fluid-conducting pipes for conducting the fluid from the reservoir to the brewing unit and the ingredient contained therein. The fluid-conducting pipes comprise connecting means, which serve to releasably assemble the brewing unit 3 to the base 2, through corresponding connecting means of the brewing unit 3.

The connection between the base 2 and the brewing unit 3 is a leak-tight fluid connection. It can also comprise data connection. The data connection between the base 2 and the brewing unit 3 can be performed by contact between the two (e.g. by electrical contact), or alternatively, it can be contactless (e.g. WIFI, RFID, GSM, Bluetooth, or equivalent contactless data transmission standards). The advantage of contactless connectivity between the machine base 2 and the brewing unit 3, is that the data transfer between the two is not impacted by the cleanliness of the physical elements of the system: in case one of several of the elements of the beverage system is dirty (e.g. spillage of liquid, water, ingredient, or product onto some parts of the machine base or the brewing unit), the quality of the data transmission between the two does not decrease, or is not stopped.

The machine base 2 is constructed such that the connecting means between said base 2 and the detachable brewing unit 3 are easily accessible to the consumer, preferably in the front side of the machine, as illustrated in FIG. 1. The machine base 2 further comprises a cup holder 5, which is movable so that it can adapt in height to different cup sizes. The cup holder 5 is placed below the brewing unit 3, as shown in FIG. 1 or 2.

The connecting means of the brewing unit 3 comprise a cylindrical protrusion 6, that extends vertically from the top surface of the brewing unit. The cylindrical protrusion 6 contains a central channel 7 that extends from the upper surface 8 of the protrusion 6, into the cavity of the brewing unit 3, and is therefore able to conduct the beverage preparation fluid from the machine base 2, towards the interior of the brewing unit, when the latter is functionally connected to the base 2. The diameter of the fluid-conducting channel is comprised between 1 and 10 mm, preferably between 2 and 7 mm.

The cylindrical connecting protrusion 6 of the brewing unit is meant to insert into a corresponding fluid delivery recessed port of the machine base—not illustrated in the drawing—. Said fluid delivery recessed port is the distal end of the fluid conducting channel system that conducts the water contained in the reservoir through the machine base 2, towards the brewing unit 3. The inner diameter of the fluid delivery recessed port of the machine base 2 corresponds to the shape and outer diameter of the cylindrical connecting protrusion 6 of the brewing unit, with the provision of the functional play. In other words, the shape and size of the fluid delivery recessed port is complementary to that of the cylindrical connecting protrusion 6, such that when the brewing unit 3 is connected functionally to the machine base 2, the connection protrusion 6 fits into the fluid delivery recessed port in a leaktight but detachable manner.

As described herein, the preferred shape of the connecting protrusion 6 is that of a cylinder. However, other cross-section shapes could possibly be used that provide the same connection functionality, such as, but not limited to square, rectangular, ovoid, trapezoid, or the like. The general longitudinal profile of the connecting protrusion (and therefore that of the delivery recessed port 6) can be slightly tapered, that is to say with a diameter that is larger at the base of the protrusion and smaller at the distal end, such that it is easier to insert into the delivery recessed port, while keeping adequate and efficient leaktight property one the connection is made.

The detachable connection between the brewing unit 3 and the machine base 2 can be achieved by any suitable means that allow fast, reliable, and user-friendly leaktight connection. Advantageously in the preferred case where the fluid connection is achieved by a cylindrical connecting protrusion that fits into a corresponding cylindrical fluid delivery recessed port, the machine base 2 and the detachable brewing unit 3 both have cooperating magnets that create a detachable assembly between the two, and secure the assembly and the fluid connection between the two when the machine is functionally assembled for brewing a beverage as illustrated in FIG. 2. In operation, when the machine base 2 and the detachable brewing unit 3 are fluidly and functionally connected together, each magnet of the machine base is aligned to a corresponding magnet of the brewing unit having an opposite polarity, so that they attract each other to keep the machine base and the detachable brewing unit secured one to another in a leaktight fluid-connected assembly. Preferably, the magnets are grouped by three in a row R, with each of the brewing unit 3 and the machine base 2 comprising two rows R of three magnets. In a row, magnets are placed with alternate polarities along a curve which is preferably concentric to the cylindrical shape of the cylindrical protrusion, or to the corresponding cylindrical recessed port. The two rows R of magnets in the machine base are located diametrically opposed relative to the centre of the fluid delivery recessed port. Similarly, the two rows R of magnets in the brewing unit are located diametrically opposed relative to the centre of the cylindrical protrusion 6—not illustrated in the drawing—.

To release the detachable brewing unit 3 from the machine main base 2, the user rotates said brewing unit around the pivot point made by the cylindrical connecting protrusion 6 pivotally engaged into the fluid delivery recessed port of the machine base. Doing this, the cylindrical connecting protrusion 6 rotates inside the fluid delivery recessed port of the base 2 until the magnets of the brewing unit are in magnetic contact with the magnets of the machine base that have the same polarity. Once magnets of same polarity start to be in alignment, the magnetic repulsion force tends to separate the base 2 and the brewing unit 3, and the disconnection between the brewing unit and the machine base is performed easily.

In all the exemplary embodiments described hereafter in the present specification, it is considered that the top wall 10 of the capsule C is the wall through which water is injected, and the bottom wall 11 is the wall through which the prepared beverage is dispensed to a consumer cup. In other terms, the water injected inside the capsule C flows from the top to the bottom of the capsule during the beverage preparation and dispensing process.

As illustrated in the following exemplary embodiments of the invention, the brewing unit comprises two cavity parts able to assemble to create a closed cavity for enclosing an ingredient capsule C, such that said brewing unit can inject fluid through said ingredient under pressure for mixing with said ingredient.

A first embodiment of a detachable brewing unit according to the invention will now be described in detail.

Figure 3A:
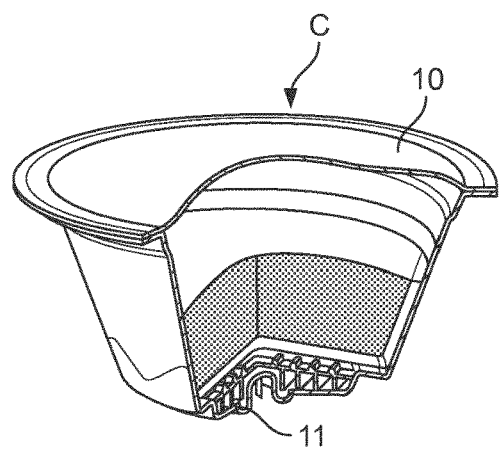
FIGS. 3A to 3C are schematic views of a beverage capsule adapted to be introduced into a brewing unit according to the invention.

As illustrated in FIG. 3A, a capsule suitable for use in a detachable brewing unit according to the first embodiment of the invention comprises capsule side walls 12 having a generally frustoconical shape with the upper diameter greater than the lower diameter, a top wall 10 which is a plastic film, and a bottom wall 11 which comprises a dispensing opening which is closed during storage, and self-open when pressure inside the capsule builds-up due to the injection of water therein. Inside the capsule compartment is a roast and ground coffee ingredient, on top of which is a water distribution micro-perforated film, like described in for instance in the Applicant's patent EP 1784344 B1.

Figure 3B:
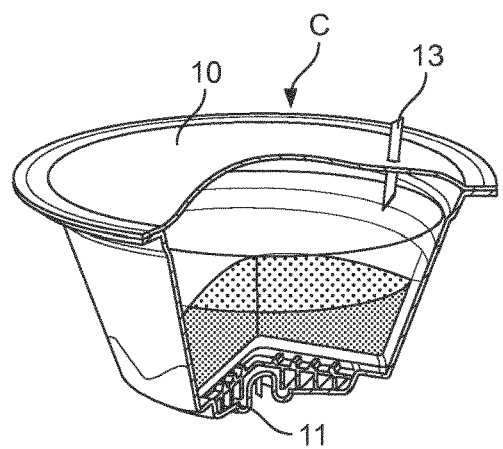
Figure 5A:
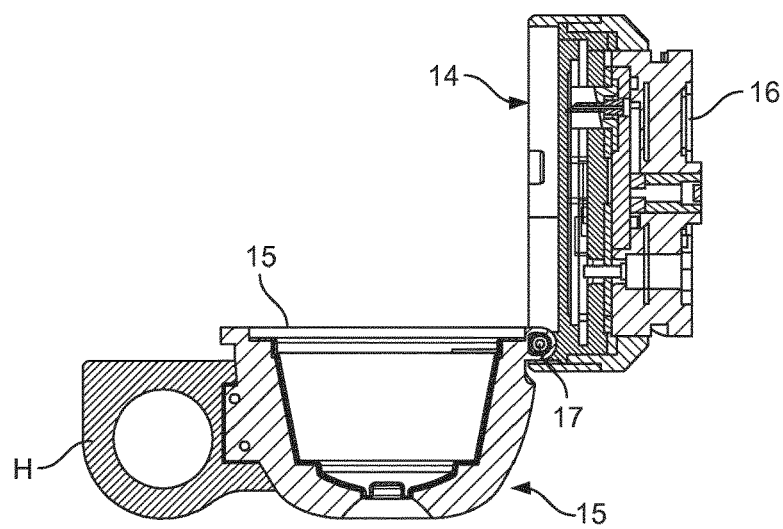
FIGS. 5A to 5C are side views similar to FIGS. 4A to 4C.
Figure 5B:
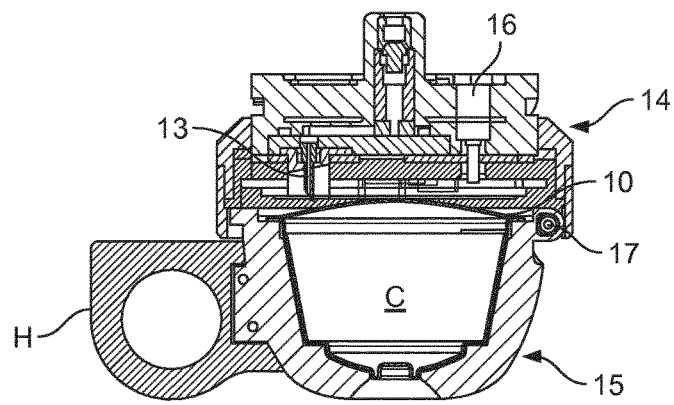

When the capsule is positioned inside the brewing unit as represented in FIG. 5B, the upper wall 10 of capsule C is designed to be pierced by a water injection needle 13 of the machine, as illustrated in FIG. 3B. Once the needle 13 has pierced the top wall of the capsule, and the machine is started, water is injected inside the capsule under pressure as shown in FIG. 3B, which flows through the space between the pierced top wall 10 and the water distributor film, and then through the water distributor film through the mass of coffee ingredient to extract all necessary coffee material therein to make a coffee beverage. Pressure inside said capsule starts to build-up.

Figure 3C:
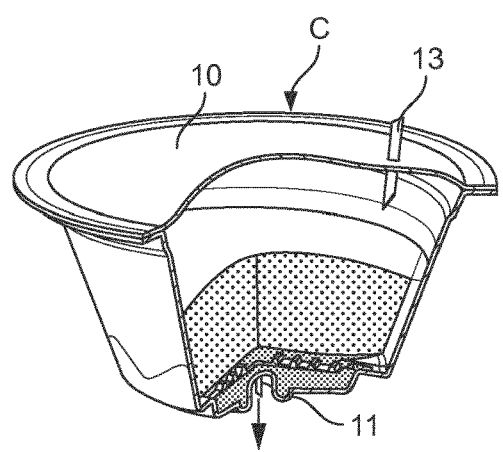

When pressure inside the capsule has reached a predetermined level, the bottom side of the capsule opens (along the principles generally known and described in the preamble of the present specification), and coffee prepared therein starts to flow out of the capsule as illustrated in FIG. 3C, by gravity and also due to the pressure inside the capsule, into a consumer cup (not shown in the drawing). The machine pump stops when the desired volume of water has passed through the coffee bed ingredient, so that the required amount of coffee is dispensed therefrom.

In this first embodiment of the invention, as illustrated in FIGS. 4A to 10, the brewing unit 3 comprises an upper cavity part 14 and a lower cavity part 15.

Figure 5C:
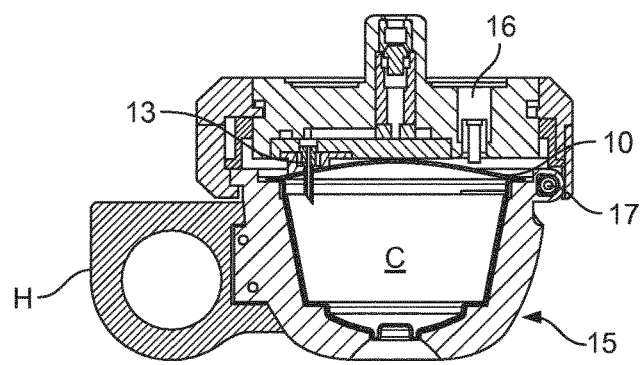

The lower cavity part 15 is a cup shaped element, as illustrated in FIG. 5A, which comprises an internal recess that is shaped and sized to accommodate at least partially the body of a capsule C, as illustrated in FIG. 5B. The lower cavity part 15 comprises an opening at its lowermost bottom part, to accommodate the dispensing opening of the capsule C as shown in FIG. 5C. It also comprises a handle "H" positioned on one side to facilitate its handling, especially attaching and removing it from the main machine base 2, as described above.

Figure 6:
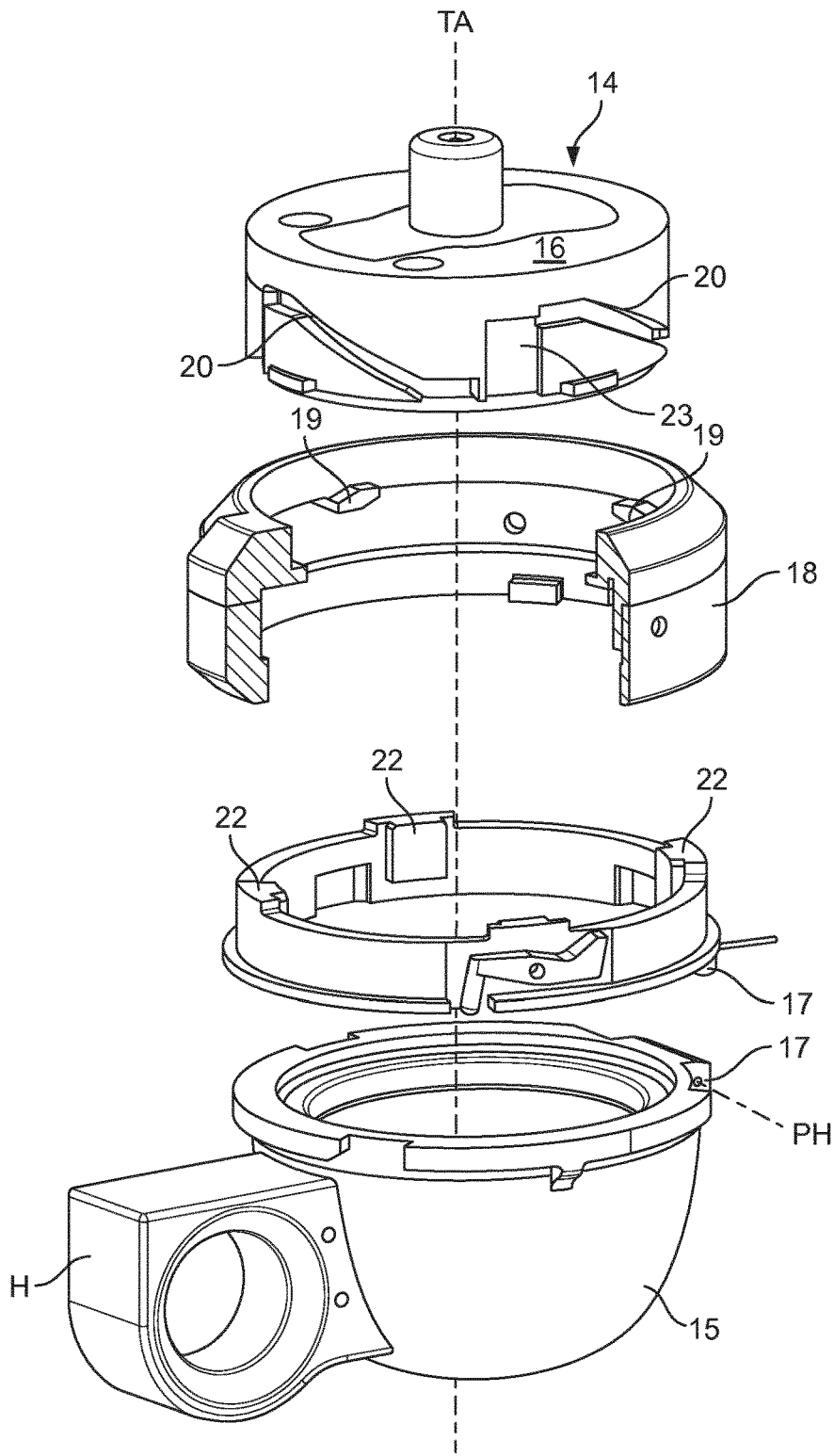
FIG. 6 is a split schematic perspective view of the first embodiment of a brewing unit according to the invention.

In the first embodiment of the invention, the upper cavity part 14 comprises an injection plate 16 wherein the water injection means are embedded, as illustrated in FIG. 6. The injection means comprise a water injection needle 13, and are suitable for injecting fluid under pressure into a capsule C for mixing with said ingredient to form a food product.

The upper cavity part 14 is linked to the lower cavity part 15 via two intermediate elements, with which it makes an assembly that is pivotally linked to the lower cavity part 15 through a pivot hinge 17.

The first intermediate element mentioned above is an actuating ring 18, which is mounted in a rotary arrangement with the injection plate 16. The actuating ring 18 has an internal diameter which fits the outside diameter of the upper cavity part 14. As shown in FIG. 6, the inner surface of the actuating ring 18 comprises three cam pins 19 which cooperate with corresponding cam grooves 20 of the upper cavity part 14 to form a cylindrical cam arrangement that is able to transform the rotating movement of the ring 18 into a translation movement of the upper cavity part 14.

The second intermediate element mentioned above is a non-rotating ring 21 represented in detail in FIG. 6, which is directly linked to the lower cavity part 15 via a pivot hinge 17. The non-rotating ring comprises at least one but preferably a plurality of, and in the present embodiment three vertical guiding protrusions 22 which are designed to slide into corresponding vertical guiding grooves 23 of the injection plate 16. Preferably, the pivot hinge comprises a spring means, for instance a coil spring—not illustrated in the drawing—that is mounted such that when the brewing unit is unlocked, it is naturally forced in the open position.

As shown in FIG. 6, the cam grooves 23 have an inclined portion that transforms the rotary movement of the actuating ring relative to the upper cavity part 14 and around the vertical axis TA, into a translation movement along said vertical axis TA of said upper cavity part and the injection means 16 attached to the latter.

In other words, the brewing unit according to the invention is structured such that it is used as follows.

Figure 4A:
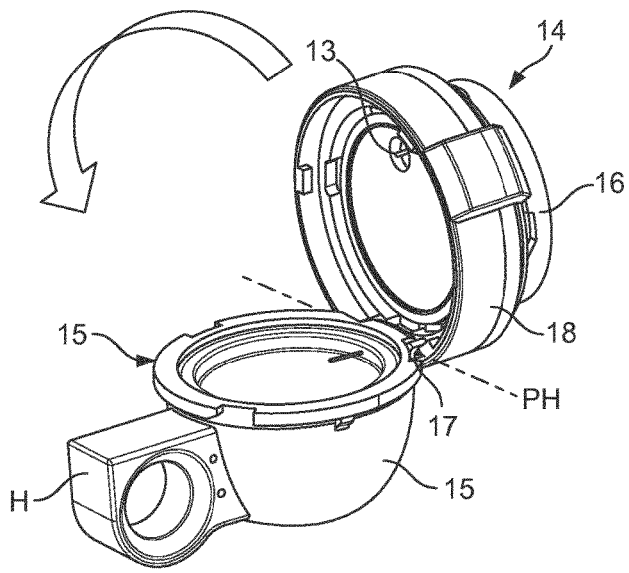
FIGS. 4A to 4C are perspective views showing the three main steps of closing and locking a first embodiment of a brewing unit according to the invention.
Figure 4B:
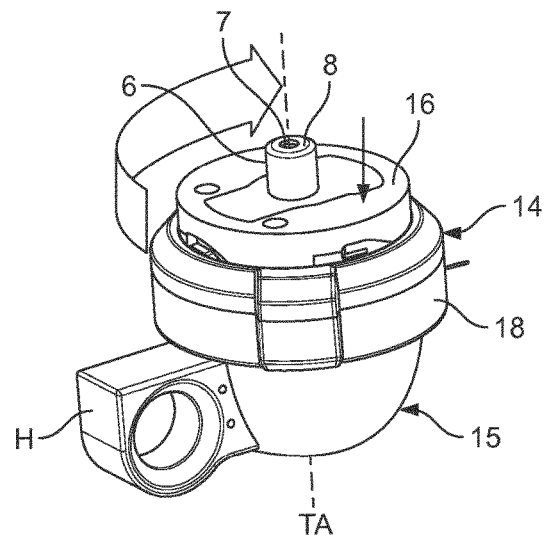
Figure 4C:
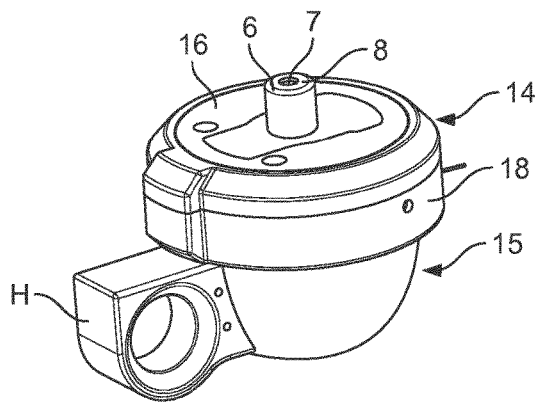

Firstly, the lower cavity part 15, and the assembly formed by the upper cavity part 14, the non-rotating ring 19, and the rotary actuating ring 16, can be pivoted around the pivot hinge 20 as illustrated with an arrow in FIG. 4A so that the upper cavity part 14 closes the lower cavity part 15 as shown in FIG. 4B.

Figure 8:
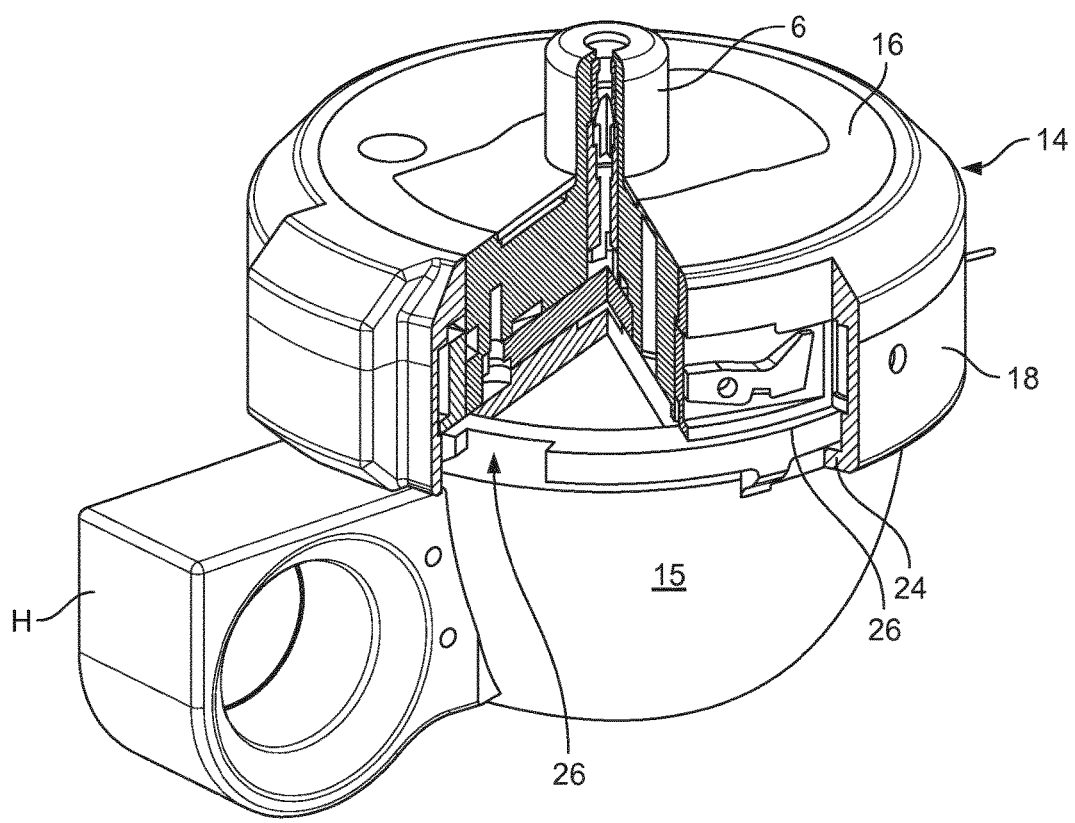
FIG. 8 is a partially cut view of a first embodiment of the brewing unit according to the invention in the closed and locked configuration.
Figure 9:
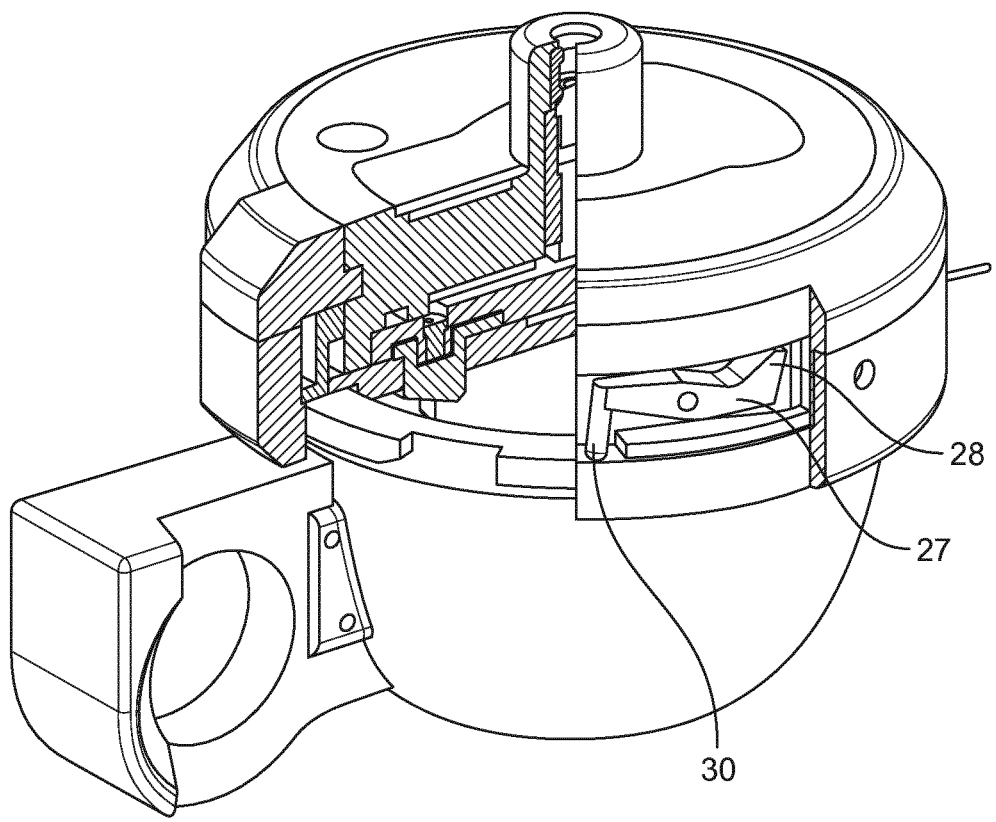
FIG. 9 is another partially cut view similar to FIG. 8.
Figure 10:
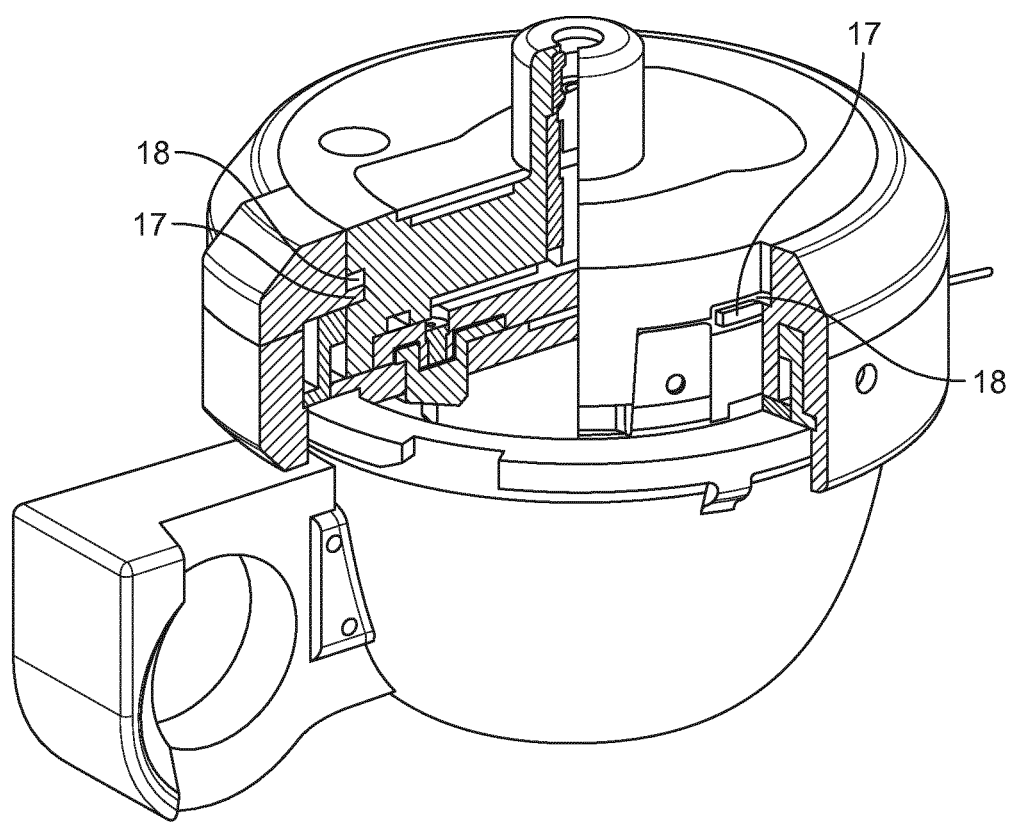
FIG. 10 is yet another partially cut view similar to FIG. 8.

Then, secondly, the three elements—upper cavity part 14, rotary actuating ring 18 and non-rotating ring 21—are mechanically linked, as described above, to one another such that, when the actuating ring 18 is rotated around the vertical axis TA as shown with an arrow in FIG. 4B, the cam pins 19 slide into the inclined cam grooves 20, and forces a downward translation movement of the upper cavity part 14 along the guiding path followed by the vertical guiding grooves 23 along the vertical guiding protrusions 22 of the non-rotating ring 21. As a result, the water injection needle 13 and the upper cavity part 14 are moved in translation relative to the lower cavity part 15 along said axis "TA" that is perpendicular to the hinge longitudinal axis "PH" shown in FIG. 6, between two positions:

an unlocked closed position—illustrated in FIGS. 4B and 5B—wherein said injection means 13 and said upper cavity part 14 are arranged in alignment relative to the lower cavity part 15 along the vertical translation axis TA, but at a distance from said lower cavity part that is sufficient to allow relative pivotal movement between said cavity parts around the hinge 17, and a locked closed position—illustrated in FIGS. 8, 9 and 10—wherein said upper and lower 15 cavity parts are translated in contact with each other to close said brewing cavity in a leak-tight manner, and wherein said injection means protrude inside the brewing cavity so as to pierce through a wall of a portion package contained therein.

In the unlocked closed position described above, the water injection needle 13 does not protrude within the brewing cavity, as illustrated in FIG. 5B, such that the capsule C contained therein is not pierced.

When the user rotates the actuating ring 18 to actuate the translation of the upper cavity part 14 and the water injection needle 13 down towards the lower cavity part 15 as described above, said water injection needle is moved to a position where it protrudes inside the brewing cavity vicinity, such that its tip pierces through the top wall 10 of the capsule C, as shown in FIG. 5C.

When the capsule is inserted in the complementary hollow cup-shaped cavity of the lower brewing cavity part 15 as illustrated in FIGS. 5B and 5C, a circumferential upper edge of the capsule C rests upon a flange surrounding the lower cavity part 15. The needle 15 is able to pierce through thin film material such as the top membrane of the capsule C so as to inject fluid thereinto.

When the brewing unit 3 is closed, the capsule C is sandwiched between the upper and lower cavity parts, so that a sealing is performed in this area and water circulating from the needle 13 towards the capsule, cannot escape from the space in between the capsule and the brewing unit, or outside of the brewing unit, i.e. the water flow is forced from the needle 13 through the interior of the capsule C where it produces a beverage, and then towards the dispensing side of the capsule and throughout the dispensing opening of the brewing unit.

Figure 7:
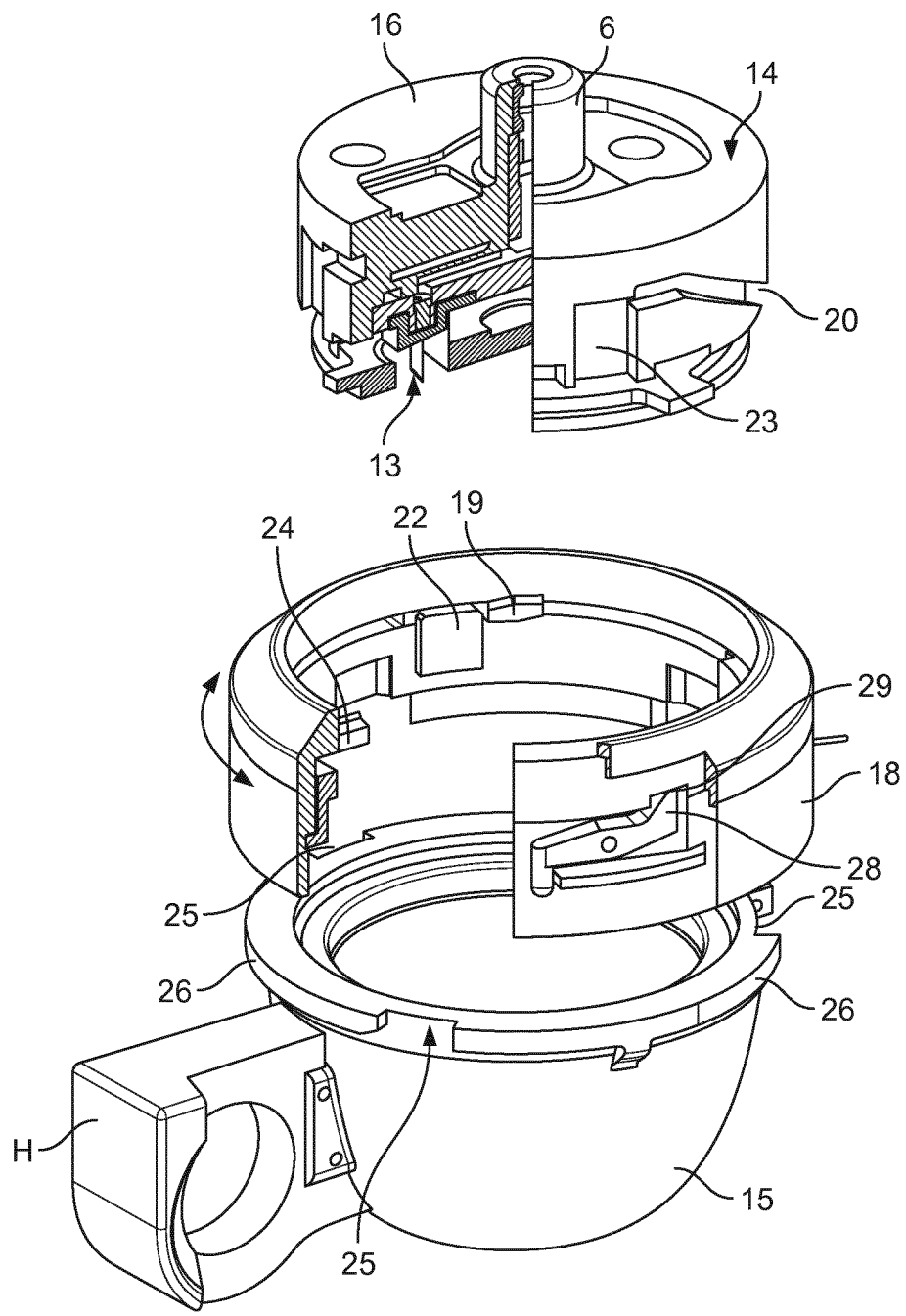
FIG. 7 is a similar view to FIG. 6, with the brewing unit partially assembled.

In the present embodiment of the invention, the fluid (e.g. water) injection means are carried by the injection plate, but are not necessarily fixed to said plate: during opening and closing movements of the detachable brewing unit 3, when the actuating ring 18 is rotated as shown by a double-end arrow in FIG. 7, the water injection means can translate together with the injection plate 16 of the upper cavity part, or alternatively, they can move independently from said injection plate, relative to the lower cavity part 15. In the latter case, only the injection means 13 can be movable relative to the lower cavity part.

To re-open the brewing unit, opposite movements as those described above, are used.

In order to lock the detachable brewing unit 3 in the locked closed configuration described above, said brewing unit further comprises a locking means for preventing disassembly of the cavity parts, said means able to withstand an internal pressure within the cavity above ambient pressure, so as to keep said cavity closed against said internal pressure when said brewing unit is detached from the fluid source.

More precisely, said locking means comprise a bayonet mechanism actuated by rotating the actuating ring. As illustrated in FIG. 7, the bayonet mechanism comprises a plurality—in the present embodiment, three—bayonet pins 24 which are located at the internal side of the lowermost portion of the rotary actuating ring 18. The three bayonet pins 24 are located such that when the actuating ring is in an unlocked position compatible with a free opening/closing movement of the brewing unit, said bayonet pins 24 can engage into corresponding bayonet notches 25 located at the periphery of a peripheral edge 26 that extends outwardly at the uppermost side of the lower cavity part 15, as represented in FIG. 7.

When the brewing cavity parts are pivoted around the pivot hinge 17 in the closed unlocked position of the brewing unit, the bayonet pins 24 engage into the bayonet grooves 25. Then, when the actuating ring is rotated to bring the brewing unit in the closed locked position, the bayonet pins 24 slide below the peripheral edge 26, as illustrated in FIG. 8, such that the pivotal movement of the brewing cavity parts around the hinge 17 is prevented.

Furthermore, the brewing unit according to the present embodiment of the invention comprises a blocking mechanism to prevent rotation of the actuating ring 18, and subsequent translation movement of the upper cavity part and water injection means downwards, when the brewing unit is not fully pivoted in the closed position described above.

As shown in FIG. 9, the blocking mechanism comprises a blocking lever 27 which blocks the possibility of rotation of the actuating ring 12 until the upper cavity part 10 is pivoted onto the lower cavity part 11 in a closed configuration of the brewing unit—illustrated in FIG. 9—.

More precisely, the blocking lever 27 is pivotally linked at a point of the periphery of the non-rotating ring 21 as represented in FIG. 6, such that it cannot rotate relative to the upper or lower cavity parts, or relative to the actuating ring 18. Said blocking lever 27 is placed in between the non-rotating ring 21 and the actuating ring 18 as illustrated in FIGS. 8 and 9, such that it pivots together with them around the hinge when the brewing unit is opened or closed.

The pivot point of the blocking lever 27 follows an horizontal axis that is aligned with a diameter of the non-rotating ring 21, such that said blocking lever 27 can pivot up and down around said axis. The lever 27 comprises a distal end that is substantially vertical and upwardly oriented with a blocking edge 28, that is inserted into a corresponding blocking recess 29 of the actuating ring 18 located above said blocking edge, when the brewing unit is unlocked as shown in FIG. 7. The locking recess 29 is located along the lower peripheral edge of the actuating ring 18 as illustrated in FIG. 7. Furthermore, the lever 27 is mounted onto its pivot axis with a return spring that normally forces said blocking edge 28 upwards when the brewing unit is in the open position.

The blocking lever 27 further comprises an opposite end 30 that protrudes outside of the lowermost surface of the non-rotating ring 21 when the brewing unit is in the open position.

When the brewing unit 3 is brought to the closed configuration as illustrated in FIG. 9, the actuating distal end 30 is brought in contact with the upper surface of the peripheral uppermost edge 26 of the lower cavity part 15, as illustrated in FIG. 9, such that the blocking lever 27 is forced to pivot against the return spring force towards a position wherein the blocking edge 28 escapes the corresponding blocking recess 29. In that closed position of the brewing unit, rotation of the actuating ring is possible, to lock/unlock said brewing unit.

Figure 11A:
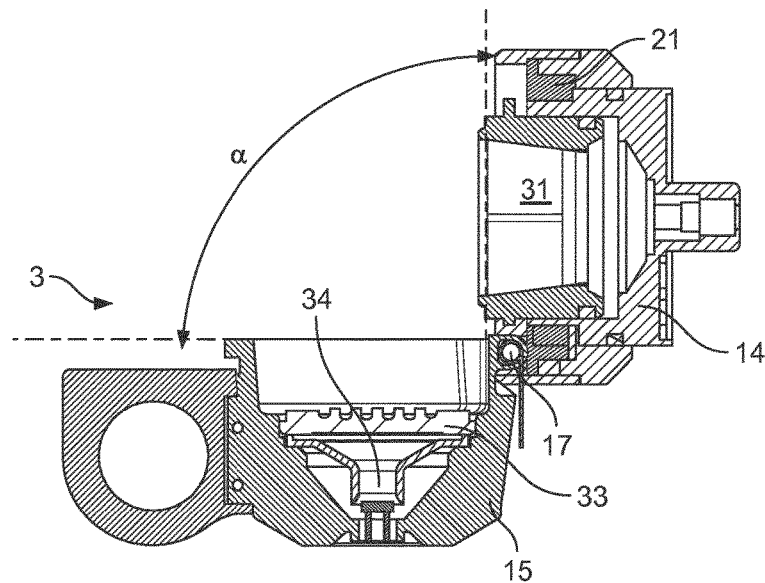
FIGS. 11A to 11C are perspective views showing the three main steps of closing and locking a second embodiment of a brewing unit according to the invention.
Figure 11B:
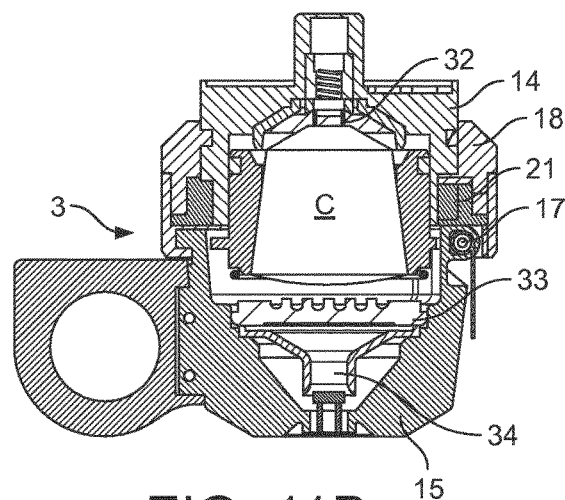
Figure 11C:
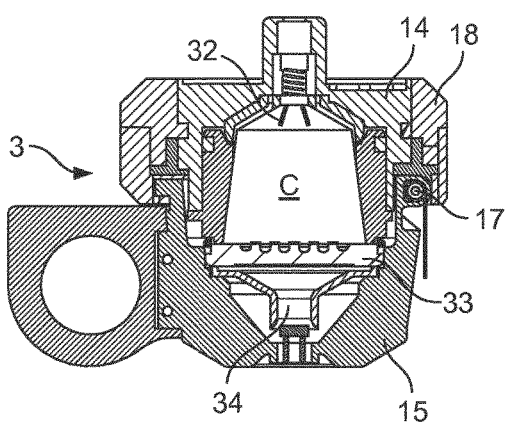

A second embodiment of a detachable brewing unit according to the invention, is represented in FIGS. 11A, 11B, 11C. In this second embodiment, the general structure and functioning of the detachable brewing unit 3 is identical to what was described above in reference to the first embodiment.

However, in this second embodiment, the upper cavity part 14 differs from the plate 16 of the first embodiment described hereinbefore, in that it comprises a frustoconical cavity 31 illustrated in FIG. 11A. The cavity 31 is adapted in shape and dimensions to receive the body of a capsule C as shown in FIG. 11B. The uppermost side of the cavity 31 comprises a plurality of blades 32 having sharp tips so that they are able to pierce through the top portion of the capsule C as shown in FIGS. 11B and 11C. The blades 32 serve to convey water under pressure from the machine through the central channel 7 of the cylindrical connecting protrusion 6, into the capsule C wherein said water extracts the beverage precursor ingredient contained therein. As an example, in the present embodiment of the invention, the capsule C contains a roast and ground coffee powder, and the capsule is of the type used in the Nespresso® coffee preparation systems.

The lower cavity part 15 also differs from that described above in reference to the first embodiment, in that it comprises a puncturing plate 33 which serves to pierce the bottom membrane of a capsule C inserted inside the brewing cavity as shown in FIG. 11C. The top surface of the puncturing plate 33 is covered by pyramid-shaped protrusions which serve to pierce the bottom membrane of the capsule C. The plate 33 comprises through-holes which serve to convey the coffee prepared within the capsule out of the brewing unit through a conveying hopper 34 located below said plate 33, illustrated in FIGS. 11A, 11B, and 11C.

FIG. 11A illustrates the brewing unit in the fully open position, with the upper and lower cavity parts spaced apart from each other around the pivot hinge 17, so that the assembly formed by the upper cavity part 14, the non-rotating ring 21 and the actuating ring 18, is pivoted so that the plane defined by the lowermost edge of the upper brewing cavity 14 (which is parallel to the plane defined by the lowermost edge of the actuating ring 18) forms an angle α of about 90° relative to the horizontal plane defined by the peripheral uppermost edge 26 of the lower cavity part 15. The opening angle α can vary in a range of about 30° to 180°, however, it is preferably within the range of 70° to 110°.

FIG. 11B illustrates the brewing unit 3 in the closed, but unlocked configuration, with a capsule C inserted therein. In this closed unlocked configuration, the angle α is 0°, since the assembly formed by the upper cavity part 14, the non-rotating and actuating rings, have been pivoted around the pivot hinge 17. The upper cavity part 14 and the water injection blades 32 are at a distance from the lower cavity part 15, so that the blades 32 do not pierce through the capsule upper wall.

In FIG. 11C, the user has rotated the actuating ring, so that the upper cavity part 14 and the puncturing blades attached to said cavity part 14, are translated downwards according to the functioning principle described above for the first embodiment of the invention. In this closed and locked configuration of the brewing unit, the angle α is also 0°, and the water injection blades 32 pierced through the upper wall of the capsule. The capsule is tightly enclosed within the brewing cavity.

Figure 12:
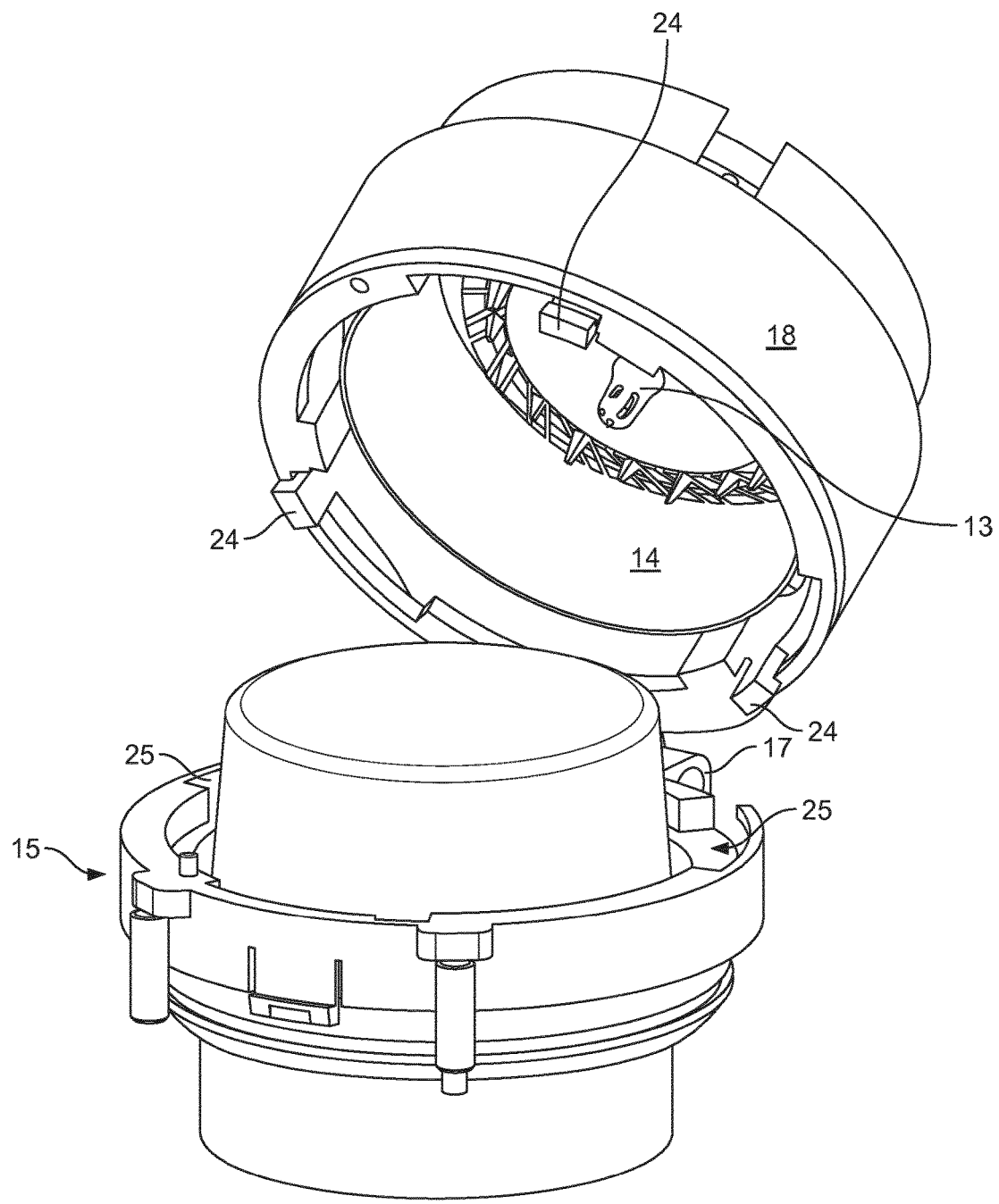
FIG. 12 is a schematic perspective view of a third embodiment of a brewing unit according to the invention, illustrated in its open configuration.
Figure 13:
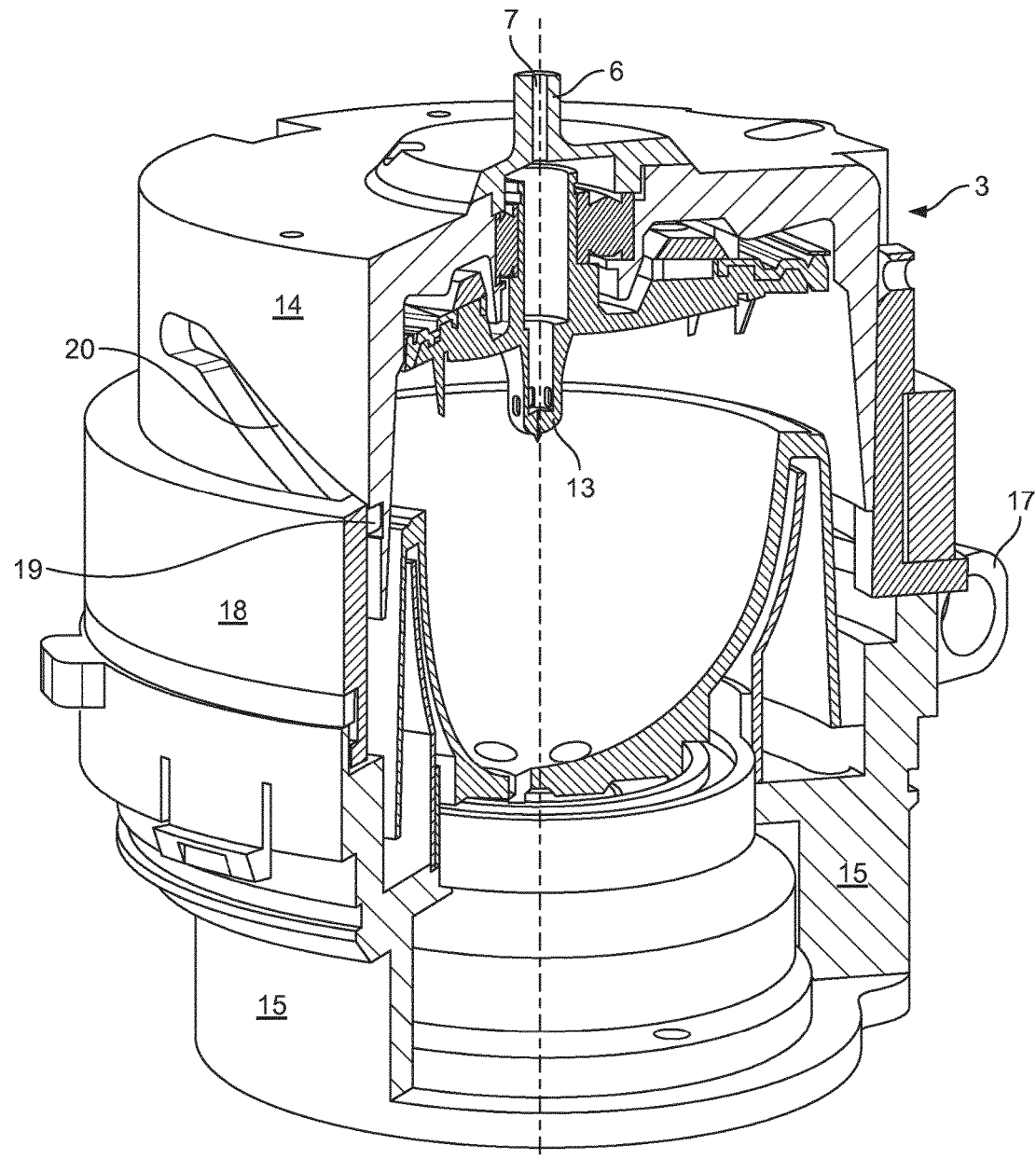
FIG. 13 is a partially cut schematic perspective view of a third embodiment of a brewing unit according to the invention, shown in a pivotal alignment of the brewing cavity, but open and unlocked.
Figure 14:
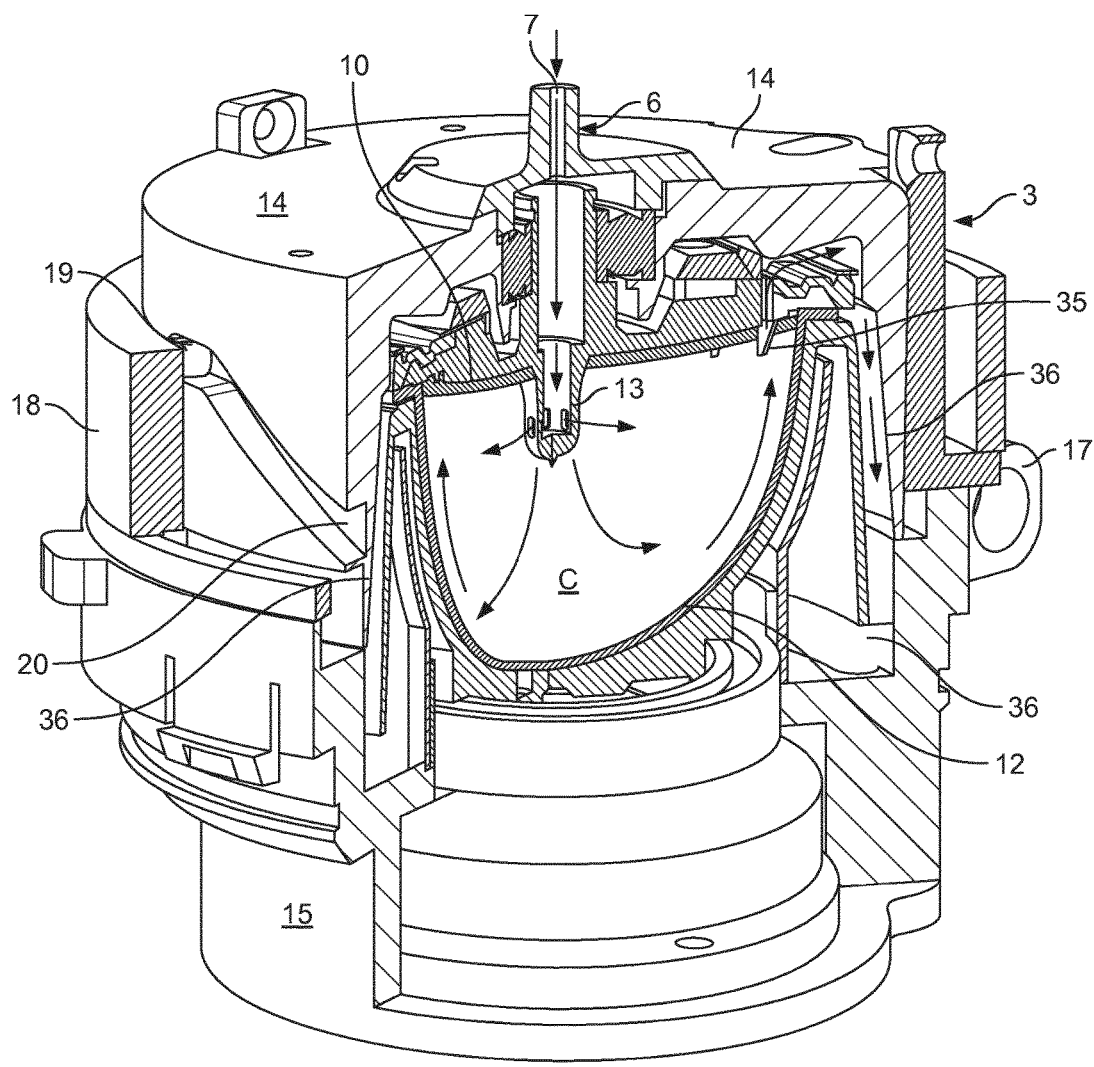
FIG. 14 is a partially cut schematic perspective view of a third embodiment of a brewing unit according to the invention, shown in a pivotal alignment of the brewing cavity, closed, and locked.

A third embodiment of a detachable brewing unit according to the invention, is represented in FIGS. 12, 13, and 14. In this third embodiment, the general structure and functioning of the detachable brewing unit 3 is identical to what was described above in reference to the first embodiment.

However, in this third embodiment, the lower cavity part 15 comprises a motor—not illustrated in the drawing—that rotates said lower cavity part together with the upper cavity part during brewing of a beverage, as described in Applicant's patent EP 2000062 B1.

FIG. 12 illustrates the brewing unit 3 in the open position. The opening angle α is about 50°. FIG. 13 shows the brewing unit 3 in the closed but unlocked position, and FIG. 14 shows the same brewing unit in the closed and locked position. In this closed and locked position, when the brewing unit 3 is loaded with a capsule C and connected to a machine base (not shown in FIG. 14), a brewing cycle can start. The upper and lower cavity parts are removably attached to one another such that when the motor actuates a rotating movement to the lower brewing cavity part 15, the upper cavity part 14 rotates as well at the same speed around a rotation axis RA shown in FIG. 13 that coincides with the symmetry axis of the brewing cavity and that of the capsule. A centrifugal force is created within the capsule C which creates an extraction of the coffee ingredient contained therein by the water that is injected through the central water injection needle 13. The extracted coffee is propelled on the lateral sides of the capsule and up through the dispensing channels pierced through the top membrane of said capsule by the dispensing blades 35 illustrated in the FIG. 14. The flow path of water entering the capsule C through the injection needle 13, and the flowpath of beverage exiting the capsule C and the brewing cavity towards the bottom dispensing side of the brewing unit 3, are represented by arrows in FIG. 14. The beverage dispensed out of the brewing cavity is collected onto collecting walls 36 that surround the brewing cavity, and then into a collecting hopper—not shown in the drawing—that comprises a dispensing opening oriented downwardly towards a user cup placed thereunder.

Again, the dissociated movements of closing the brewing cavity by pivoting the upper and lower cavity parts, and then translating vertically the injection means 13 and upper cavity part 14 relative to the lower cavity part 15, follows the principle of the invention by preventing accidental tearing or damaging of the capsule walls by the injection means that could arise if the upper cavity part and injection means would be too close to the lower cavity part, due to the pivotal movement and angle, as described above in the background part of the description.

In all the above cited embodiments of the invention, the orientation of the brewing cavity parts can be inverted, so that the fluid connecting protrusion can be located at the surface of the lower cavity part, and the dispensing opening of the brewing cavity can be located at another place than the lowermost side of said brewing unit as described above. In other words, fluid-conducting entry channel towards the brewing unit, and dispensing opening of said brewing unit can be placed at various places around the brewing cavity, as long as the working principle of the invention is respected, i.e.:

(i) upper and lower cavity parts forming a brewing cavity suitable for enclosing a portion package, and (ii) fluid injection means embedded into said upper cavity part, for injecting fluid under pressure into said package for mixing with said ingredient to form a food product, and said upper and lower cavity parts being hinged one to the other in a pivotal arrangement between open and closed positions, and in that said fluid injection means and/or said upper cavity part are further movable in translation relative to the hinge along an axis that is perpendicular to the hinge longitudinal axis, between:

an closed and unlocked position wherein said injection means and/or said upper cavity part is/are arranged at a distance from the lower cavity part sufficient to allow relative pivotal movement between said cavity parts, and a closed and locked position wherein said upper and lower cavity parts are translated in contact with each other to close said brewing cavity, preferably in a leak-tight manner, and wherein said injection means protrude inside the brewing cavity so as to pierce through a wall of a portion package contained therein.

Also, in all the above cited embodiments of the invention, the amplitude of the movements for closing and locking/unlocking the brewing unit are comprised within the following exemplary indicative ranges:

For a "NESCAFE® Dolce Gusto®" brewing unit (corresponding to a brewing unit according to the first embodiment described above): amplitude of the vertical movement of the upper cavity part relative to the lower cavity part is comprised between 5 and 20 mm, preferably between 6.5 and 10.5 mm, corresponding to an amplitude of the rotational movement of the actuating ring that is comprised between 30° and 90°, preferably between 45° and 65°, For a "Nespresso® classic" brewing unit (corresponding to a brewing unit according to the second embodiment described above): amplitude of the vertical movement of the upper cavity part relative to the lower cavity part is comprised between 6.5 to 8.5 mm, corresponding to an amplitude of the rotational movement of the actuating ring that is comprised between 30° and 90°, preferably between 45° and 60°.

It should be understood that various changes and modifications to the presently preferred embodiments described herein will be apparent to those skilled in the art. Such changes and modifications can be made without departing from the spirit and scope of the present invention and without diminishing its attendant advantages. It is therefore intended that such changes and modifications be covered by the appended claims.

The invention claimed is:

1. A brewing unit having a brewing cavity configured for enclosing a food preparation ingredient contained in a portion package, the brewing unit comprising:

first and second cavity parts forming the brewing cavity configured for enclosing the portion package;

a pivot hinge connecting the first and second cavity parts in a pivotal arrangement between an open position and a closed position;

a fluid injector embedded into the first cavity part, the fluid injector configured for injecting fluid under pressure into the portion package for mixing with the food preparation ingredient to form a food product;

wherein when the first and second cavity parts are pivoted in the closed position, the fluid injector and/or the first cavity part are further movable in translation relative to the second cavity part, along an axis that is perpendicular to the pivot hinge longitudinal axis, between:

a closed and unlocked position wherein the fluid injector and/or the first cavity part is/are arranged at a distance from the second cavity part sufficient to allow relative pivotal movement between the first and second cavity parts;

a closed and locked position wherein the first and second cavity parts are translated in contact with each other to close the brewing cavity, and the fluid injector protrudes inside the brewing cavity to pierce through a wall of the portion package contained therein;

wherein the brewing unit further comprises a leak-tight connector, and the brewing unit is at least partially detachably connectable to a pressurized fluid source of a beverage preparation machine through the leak-tight connector; and wherein the leak-tight connector is part of only one of the first and second cavity parts, such that the other one of the first and second cavity parts is movable independently and detachable from the pressurized fluid source, when the other one of the first and second cavity parts of the brewing unit is functionally connected to the pressurized fluid source.

2. The brewing unit according to claim 1, wherein the first cavity part is an upper cavity part, and the second cavity part is a lower cavity part of the brewing unit.

3. The brewing unit according to claim 1, which comprises a sealing member configured for preventing fluid leakage outside of the brewing unit when the first and second cavity parts are assembled and locked together.

4. The brewing unit according to claim 3, wherein the sealing member comprises an O-ring located at an interface between the first and second cavity parts of the brewing unit.

5. The brewing unit according to claim 1, wherein the fluid injector comprises a hollow needle.

6. The brewing unit according to claim 1, wherein the brewing unit is water and detergent resistant, washable in a dishwasher at a temperature of between 15° C. and 85° C., and made of a material selected from the group consisting of: polyethylene, polypropylene, polystyrene, polycarbonate, metal, alloy, natural or synthetic rubber, and combinations thereof.

7. The brewing unit according to claim 2, wherein the brewing cavity has a vertical symmetry axis for accommodating the portion package having a symmetrical shape, and wherein the upper cavity part comprises an extraction plate mounted in a rotary arrangement within the upper cavity part, the extraction plate comprising:
  at least one injection needle for piercing the ingredient package, the at least one injection needle is aligned with the central axis of the portion package for injecting an ingredient-extracting fluid therein, and
  at least one hollow extracting blade or needle having a sharp end configured for piercing the portion package at a distance from the central axis of the portion package and conducting the food product produced therein from within the portion package towards the outside of the brewing unit.

8. A brewing unit having a brewing cavity configured for enclosing a food preparation ingredient contained in a portion package, the brewing unit comprising:
  first and second cavity parts forming the brewing cavity configured for enclosing the portion package;
  a pivot hinge connecting the first and second cavity parts in a pivotal arrangement between an open position and a closed position;
  a fluid injector embedded into the first cavity part, the fluid injector configured for injecting fluid under pressure into the portion package for mixing with the food preparation ingredient to form a food product;
  wherein when the first and second cavity parts are pivoted in the closed position, the fluid injector and/or the first cavity part are further movable in translation relative to the second cavity part, along an axis that is perpendicular to the pivot hinge longitudinal axis, between:
  a closed and unlocked position wherein the fluid injector and/or the first cavity part is/are arranged at a distance from the second cavity part sufficient to allow relative pivotal movement between the first and second cavity parts;
  a closed and locked position wherein the first and second cavity parts are translated in contact with each other to close the brewing cavity, and the fluid injector protrudes inside the brewing cavity to pierce through a wall of the portion package contained therein;
  wherein the brewing unit further comprises a leak-tight connector, and the brewing unit is at least partially detachably connectable to a pressurized fluid source of a beverage preparation machine through the leak-tight connector; and
  wherein the leak-tight connector comprises a cone-shaped bore adapted to receive a flexible hosepipe of the pressurized fluid source.

9. A brewing unit having a brewing cavity configured for enclosing a food preparation ingredient contained in a portion package, the brewing unit comprising:
  first and second cavity parts forming a brewing cavity configured for enclosing the portion package;
  a pivot hinge connecting the first and second cavity parts in a pivotal arrangement between an open position and a closed position;
  a fluid injector embedded into the first cavity part, the fluid injector configured for injecting fluid under pressure into the package for mixing with the food preparation ingredient to form a food product;
  wherein when the first and second cavity parts are pivoted in the closed position, the fluid injector and/or the first cavity part are further movable in translation relative to the second cavity part, along an axis that is perpendicular to the pivot hinge longitudinal axis, between:
  a closed and unlocked position wherein the injector and/or the first cavity part is/are arranged at a distance from the second cavity part sufficient to allow relative pivotal movement between the first and second cavity parts; and
  a closed and locked position wherein the first and second cavity parts are translated in contact with each other to close the brewing cavity, and the injector protrudes inside the brewing cavity to pierce through a wall of the portion package contained therein;
  wherein the translation movement of the fluid injector and/or the first cavity part between the closed locked and unlocked positions is actuated by rotating an actuating ring connected to the first cavity part via cam pins and cam grooves that form a cylindrical cam engagement, the first cavity part being further engaged in translation with a non-rotating ring that is pivotally hinged to the second cavity part, so as to transform the rotary movement of the actuating ring into a translation movement of the fluid injector and/or the first cavity part relative to the second cavity part.

10. The brewing unit according to claim 9, comprising a lock configured for preventing disassembly of the first and second cavity parts, the lock able to withstand an internal pressure within the brewing cavity above ambient pressure to keep the brewing cavity closed against the internal pressure when the brewing unit is detached from a pressurized fluid source.

11. The brewing unit according to claim 10, wherein the lock comprises a bayonet mechanism actuated by rotating the actuating ring.

12. The brewing unit according to claim 10, which further comprises a blocking mechanism attached to the non-rotating ring that prevents rotation of the actuating ring and subsequent translation movement of the first cavity part and the fluid injector downwards, when the brewing unit is not fully pivoted in the closed position.

13. A beverage preparation machine comprising a machine base with a fluid source, a fluid heating and/or chilling element, a fluid pump and a fluid connection adapted to leaktightly and releasably connect a brewing unit having a brewing cavity for enclosing a food preparation ingredient contained in a portion package, the brewing unit comprising:
  first and second cavity parts forming a brewing cavity configured for enclosing the portion package; a fluid injector embedded into the first cavity part and configured for injecting fluid under pressure into the portion package for mixing with the food preparation ingredient to form a food product; a pivot hinge connecting the first and second cavity parts in a pivotal arrangement between an open position and a closed position, wherein when the first and second cavity parts are pivoted in a closed position, the fluid injector and/or the first cavity part are further movable in translation relative to the second cavity part, along an axis that is perpendicular to the pivot hinge longitudinal axis, between: a closed and unlocked position wherein the fluid injector and/or the first cavity part is/are arranged at a distance from the second cavity part sufficient to allow relative pivotal movement between the cavity parts; and a closed and locked position wherein the first and second cavity parts are translated in contact with each other to close the brewing cavity, and the fluid injector protrudes inside the brewing cavity to pierce through a wall of a portion package contained therein; and
  wherein the translation movement of the fluid injector and/or the first cavity part between the closed locked and unlocked positions is actuated by rotating an actuating ring connected to the first cavity part via cam pins and cam grooves that form a cylindrical cam engagement, the first cavity part being further engaged in translation with a non-rotating ring that is pivotally hinged to the second cavity part, so as to transform the rotary movement of the actuating ring into a translation movement of the fluid injector and/or the first cavity part relative to the second cavity part.

* * * * *